United States Patent Office 3,346,391
Patented Oct. 10, 1967

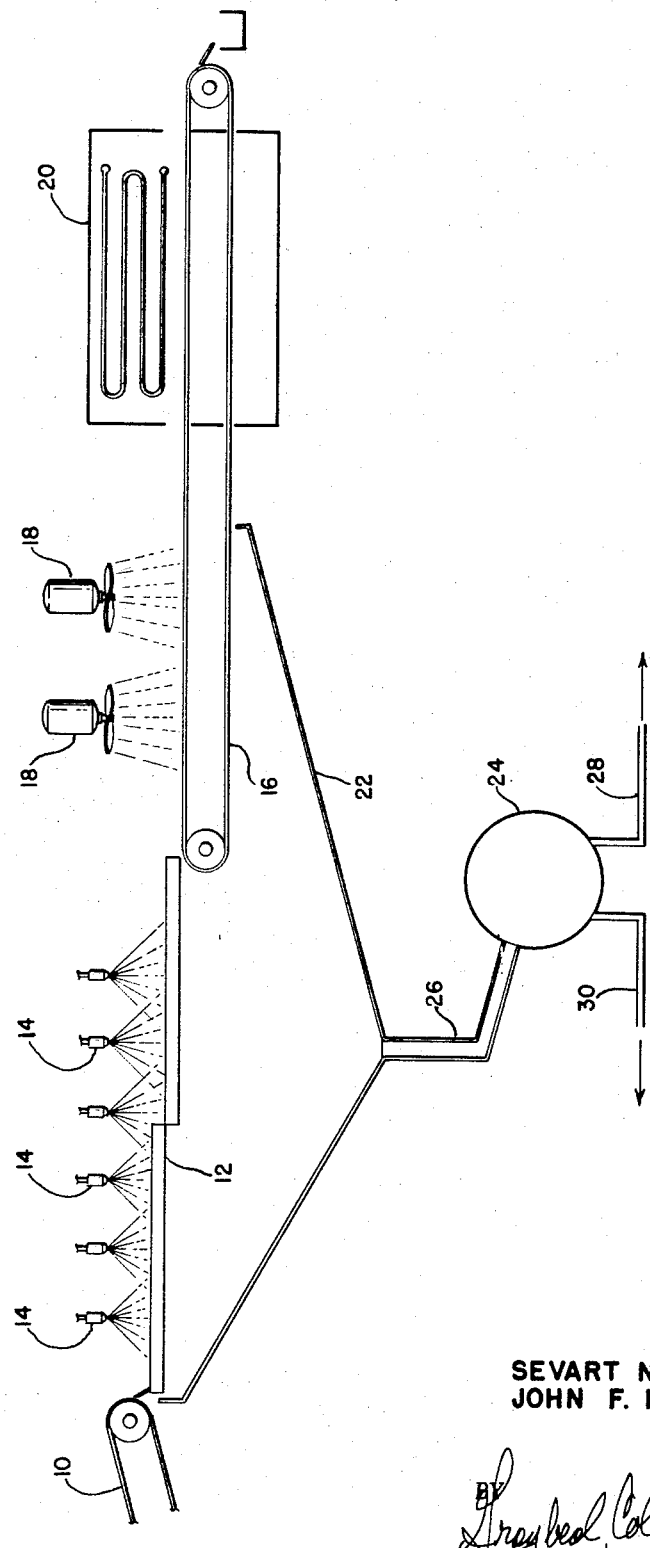

3,346,391
PROCESS OF REMOVING AND RECOVERING OIL FROM DEEP-FRIED PRODUCTS
Sevart N. Miller, Warden, and John F. Flodin, Sunnyside, Wash., assignors to Flodin, Inc., Sunnyside, Wash., a corporation of Washington
Filed June 14, 1965, Ser. No. 463,672
13 Claims. (Cl. 99—100)

This invention relates to a new and novel process for removing and recovering excess oil from food products subjected to hot oil cooking or blanching. More particularly does this invention relate to a new and novel process in which removal of oil from food products involves a unique application of water to the product and subsequent separation of the oil from the water so that the oil may be reused.

Heretofore known systems of preparing food products and particularly french-fried potatoes conventionally call for pre-cooking or blanching the product in oil. In all instances of cooking, blanching, deep frying or other treatment in oil, a persistant problem is removal of excess oil. If insufficient amounts of oil are removed from the product, excess oil will deposit on the conveyors' processing equipment, and clog plumbing lines and sewers. With the excess oil coagulating on the conveying and processing equipment, there is generated the additional tedious and time-consuming task of washing the excess grease and oil off the equipment. Furthermore, since insufficient amounts of excess oil are removed from the product in conventional processes, the product is left encased in an undesirably thick coating or film of oil, and thus the excess oil is wasted. Because oil is wasted and lost, cost of the product is raised and the product quality is downgraded.

The instant process for removing and recovering oil from deep-fried products represents a significant step forward in the art of preparing and processing pre-cooked and blanched foods such as french-fried potatoes. Briefly, the system contemplates that as soon as the deep-fried product is removed from the cooker, it is transferred immediately to a wire belt conveyor or other conveying means. Such conveying means may include a well-known shaker bed. The product and oil upon removal from the cooking stage are quite hot. While the product is on the conveyor it is subjected to a controlled spray of water. Water is introduced and sprayed onto the product on the conveyor in such a way preferably as to minimize or keep to an absolute minimum, the amount of water which is mixed with the oil. It has been found that the amount of oil removed from the product can be controlled by the type of water application as well as by the quantity of water employed. As a practical matter, approximately four to six percent by weight of the product is oil and under this new process of removing and separating, the amount of the oil on the product which is removed and recovered can be controlled. Since it is desirable to keep to a minimum the amount of water which must be handled, application of the water is preferably made in the form of a fine mist or fog spray. Any type of spray may be utilized but a fine spray with the amount of water applied regulated through the number of nozzles and nozzle capacity is most advantageous. Small, additional amounts of oil may be removed by air blast, but as a practical matter, substantially all of the oil to be removed is taken off on the conveyor by the washing action of the water. A catch pan under the conveyor receives and collects the oil and water mixture. The mixture is then conducted to a separator system where the oil is separated from the water. The water is discharged or reused and the recovered oil is recycled for reuse. Many advantages have been found to result from this new system, but the primary one is recovery of oil for the system since the oil is employed in large quantities and represents a substantial cost item.

Accordingly, it is a feature of this invention to provide a method removing and recovering oil from food products which enables recovery and reuse of a substantial amount of the oil which leaves the cooking or blanching containers with the product.

Another feature of this invention is to supply a method for removing and recovering vegetable oil from oil treated food products in which the temperature of the product may be lowered during the oil removal steps, thus increasing the freezing capacity of a freezing tunnel or unit if the product is subsequently frozen.

Still another feature of this invention is to provide a method removing and recovering oil from food products wherein the amount of oil left on the product is controlled, thereby improving the quality of the product.

Yet another feature of this invention is to supply a method for removing and recovering oil from food products in which the final product, if frozen has improved texture, and if refried has a crisper quality.

Yet another feature of this invention is to provide a method of removing and recovering oil from food products wherein because oil represents the largest cost item, the cost of oil used is reduced substantially.

A further feature of this invention is to furnish a method of removing and recovering oil from food products wherein susbtantially all the oil to be removed from a product is taken off in such a way that processing equipment and plumbing and sewer lines are not fouled and clogged with oil.

An even further feature of this invention is to supply a method for removing and recovering oil from food products which tends to prevent products which are subsequently frozen from freezing together.

An even further feature of this invention is to provide a unique method for removing and recovering oil from food products which is simple and therefore readily adaptable to existing as well as new food processing equipment lines.

A further feature of this invention is to provide a method for removing and recovering oil from food products which maintains packaging equipment such as scales, sizers, bagging and boxing devices free of oil and grease and thereby promotes efficient operation of said packaging equipment.

These and other objects, advantages and features will become apparent in the details and operation of this method as more fully hereinafter described and claimed. Reference will be had to the accompanying drawing wherein like numerals will refer to like parts throughout, and in which:

The figure represents a general schematic or diagrammatic representation of the steps employed in practicing the principles of this invention.

Referring now to the drawing, it will be understood that the deep-fried product, immediately upon being removed from the cooking vessels, is transferred by conveyor or other means 10 to a receiving conveyor generally designated by the number 12. Conveyor 12 is a conventional structure such as a shaker bed or wire belt commonly used in the processing of deep-fried food products. As the hot oil-treated food product is deposited on conveyor 12 by the means 10, the oil is dripping off and also may be shaken off. The product passes along the length of conveyor or shaker bed 12, but in the case of a shaker bed, vibration alone is not sufficient to remove all the oil from the product which is capable of being taken therefrom. Thus, excess oil under old processes was left on the product. This ineffective removal of excess oil accounted for oil accumulating on the equipment. Oil recovered in conventional processes is substantially less in quantity than that recovered under this system.

The instant invention involves spraying the product on conveyor or shaker bed 12 with a a water spray with a plurality of nozzles 14. As the product moves and tumbles along conveyor 12 it will be exposed on all sides to the water spray. The water particles admix with the oil to such an extent that excess oil is taken off. The oil is literally washed off the product by the water, and the water and oil mixture is caught beneath the conveyor 12. The amount of oil removed from the product may be controlled by the type of spray and amount of water employed. It is emphasized that the oil is not removed separately from the water. The oil and water form an intimate admixture as the product is sprayed.

Upon being discharged from the conveyor 12, the product may be transferred to the cooling belt 16 which is also a wire mesh type continuous conveyor. It will be appreciated that conveyor 12 and conveyor 16 have been shown only illustratively. A simple conveyor may well be utilized as those skilled in the art are aware. Air blast fans 18 may be used to further cool the product itself after spraying, if the product is to be frozen. As a practical matter, it has been found that all removable oil has been taken off the product on conveyor 12 beneath the spray. Hence, the old problem of oil drippage and collection on the cooling portion of system is virtually eliminated. The controlled spray over conveyor 12 employs either hot or cold water and if the system has good pressure, no pumps or other equipment are needed to boost the pressure for the nozzles 14. Ideally, pressure in the nozzles or spray heads 14 should be in the 60 to 90 p.s.i. range. It will be understood that the spray not only is effective in washing all of the removable excess oil from the product, but very desirably cools the product itself to increase the capacity of the freezing tunnel 20, if the product is to be subsequently frozen.

A catch pan 22 beneath the conveyor or shaker bed 12 receives the oil and oil and water mixture and transfers it to a separating means 24. The oil-water separating step 24 may be of a vat-type settling or decanting, or alternatively, a centrifugal separator. No limitation is intended on means for separation since numerous processes are known to such persons skilled in the art. If necessary, heating elements may be installed either in conjunction with catch pan 22 or with line 26 carrying oil and water from the catch pan to the separator 24. In separator 24, the oil is recycled for reuse through a line as at line 28, while the water is directed through a line 30 for discharge or other use. Hence, where a larger amount of oil on the product in conventional systems has been lost, that oil in this process which is removed from the product is recovered and recycled for use in the oil treatment stage.

It is contemplated that other types of water applications to the product may be used, such as running the product through a tank of water. Generally, however, in order to keep to a minimum the amount of machinery employed in the recovery process, it is most desirable to use as little water as possible to remove the oil. Thus, a fine mist or fog-type spray is preferable. Furthermore, it has been found that a fog or mist-type spray is best since a coarse spray or water immersion would not give the intimate oil-water mixture which occurs with a fine spray. Generally and without limiting the disclosure to a precise pressure range, it could be alternatively said that pressure must be such as to generate a controlled spray through appropriate nozzles in order to remove the correct amount of oil. It is felt that applicants have made a significant contribution to the processing of oil treated food products and particularly french-fried potatoes.

The foregoing is considered as illustrative only of the principles of this invention. Numerous modifications and changes will occur to those skilled in the art, and hence it is not desired to limit the invention to the exact method and operation as shown and described. Accordingly, all suitable modifications and equivalents may be resorted to which fall within the scope of the invention.

What is claimed is:

1. Process for removing and recovering oil from food products, comprising: (a) removing the food product from its oil treatment container; (b) transferring said product to a conveyor means; (c) subjecting said product while it is on said conveyor means to water to remove excess oil from said product; (d) receiving the oil and water from said conveyor means in a receptacle; (e) transferring said oil and water from said receptacle to oil-water separator means; and (f) separating said oil and water to recover said oil.

2. Process for removing and recovering oil from food products, comprising: (a) removing the food product from its cooking container; (b) transferring said product to a pervious conveyor means; (c) subjecting said product while it is on said conveyor means to a water spray to remove excess oil from said product; (d) receiving oil from said product and water from said conveyor means in a receptacle; (e) transferring said oil and water from said receptacle to oil-water separator means; and (f) separating said oil and water to recover said oil.

3. Process for removing and recovering oil from food products, comprising: (a) removing the food product from its oil treatment container; (b) transferring said product to a conveyor means; (c) subjecting said product while it is on said conveyor to a fine water spray to remove excess oil from said product; (d) receiving oil from said product and water from said conveyor means in a receptacle; (e) transferring said oil and water from said receptacle to oil-water separator means; and (f) separating said oil and water to recover said oil.

4. Process for removing and recovering oil from food products, comprising: (a) removing the food product from its cooking container; (b) transferring said product to a vibrating and pervious shaker bed; (c) subjecting said product while it is on said vibrating shaker bed to a water spray to remove excess oil from said product; (d) receiving oil and water from said product and said shaker bed in a receptacle; (e) transferring said oil and water from said receptacle to oil-water separator means; and (f) separating said oil and water to recover said oil.

5. Process for removing and recovering oil from food products, comprising: (a) removing the food product from its oil treatment container; (b) transferring said product to a conveyor means; (c) subjecting said product while it is on said conveyor means to water to remove excess oil from said product in the form of an oil-water mixture; (d) receiving said oil-water mixture from said conveyor means in a receptacle; (e) transferring said oil-water mixture from said receptacle to oil-water separator means; and (f) separating said oil and water to recover said oil.

6. Process for removing and recovering oil from food products, comprising: (a) removing the food product from its cooking container; (b) transferring said product to a pervious conveyor means; (c) subjecting said product while it is on said conveyor means to a water spray to remove excess oil from said product in the form of an oil-water mixture; (d) receiving said oil-water mixture beneath said conveyor means in a receptacle; (e) transferring said oil-water mixture from said receptacle to oil-water separator means; and (f) separating said oil and water to recover said oil.

7. Process for removing and recovering oil from food products, comprising: (a) removing the food product from its oil treatment container; (b) transferring said product to a conveyor means; (c) subjecting said product while it is on said conveyor to a fine water spray to remove excess oil from said product in the form of an intimate oil-water mixture; (d) receiving said oil-water mixture from said product beneath said conveyor means in a receptacle; (e) transferring said oil-water mixture from said receptacle to oil-water separator means; and (f) separating said oil and water to recover said oil.

8. Process for removing and recovering oil from food products, comprising: (a) removing the food product from its oil treatment container; (b) transferring said product to a vibrating and pervious shaker bed; (c) subjecting said product while it is on said vibrating shaker bed to a water spray to remove excess oil from said product in the form of an oil-water mixture; (d) receiving said oil-water mixture from said product beneath said shaker bed in a receptacle; (e) transferring said oil-water mixture from said receptacle to oil-water separator means; and (f) separating said oil and water to recover said oil.

9. In a process for removing and recovering oil from food products, the steps comprising: (a) removing the food product from its oil treatment container; (b) transferring said product to a conveyor means; and (c) subjecting said product while it is on said conveyor means to water to remove excess oil from said product.

10. In a process for removing and recovering oil from food products, the steps comprising: (a) removing the food product from its cooking container; (b) transferring said product to a pervious conveyor means; and (c) subjecting said product while it is on said conveyor means to a water spray to remove excess oil from said product.

11. In a process for removing and recovering oil from food products, the steps comprising: (a) removing the food product from its cooking container; (b) transferring said product to a vibrating and pervious shaker bed; (c) subjecting said product while it is on said vibrating shaker bed to a water spray to remove excess oil from said product.

12. Process for removing and recovering oil from food products, comprising: (a) removing the food product from its oil treatment container; (b) transferring said product to a product holding means; (c) subjecting said product while it is on said product holding means to water to remove excess oil from said product; (d) receiving the oil and water from said conveyor means in a receptacle; (e) transferring said oil and water from said receptacle to oil-water separator means; and (f) separating said oil and water to recover said oil.

13. Process for removing and recovering oil from food products, comprising: (a) removing the food product from its cooking container; (b) transferring said product to a vibrating and pervious shaker bed; (c) subjecting said product while it is on said vibrating shaker bed to water spray to remove excess oil from said product; (d) receiving oil and water from said product in a receptacle; (e) transferring said oil and water from said receptacle to oil-water separator means; and (f) separting said oil and water to recover said oil.

References Cited

UNITED STATES PATENTS

| | | | |
|---|---|---|---|
| 2,855,308 | 10/1958 | Buechele et al. | 99—100 |
| 2,886,439 | 5/1959 | Eytinge | 99—100 |
| 3,127,271 | 3/1964 | Goulston | 99—100 |

OTHER REFERENCES

Jones, L. C.: Simplot Potato Research Leads to New Quick Frozen Products, 1953, Western Caner and Packer 45, No. 7, 13–15.

Talburt, W. F.: Potato Processing, The Avi Publishing Co., Westport, Conn., 1959, pages 294–295.

A. LOUIS MONACELL, *Primary Examiner.*

D. M. NAFF, *Assistant Examiner.*